July 6, 1965  C. E. ANDERSON ETAL  3,192,948
BALL VALVE WITH SEALING CAPSULE
Filed June 5, 1961
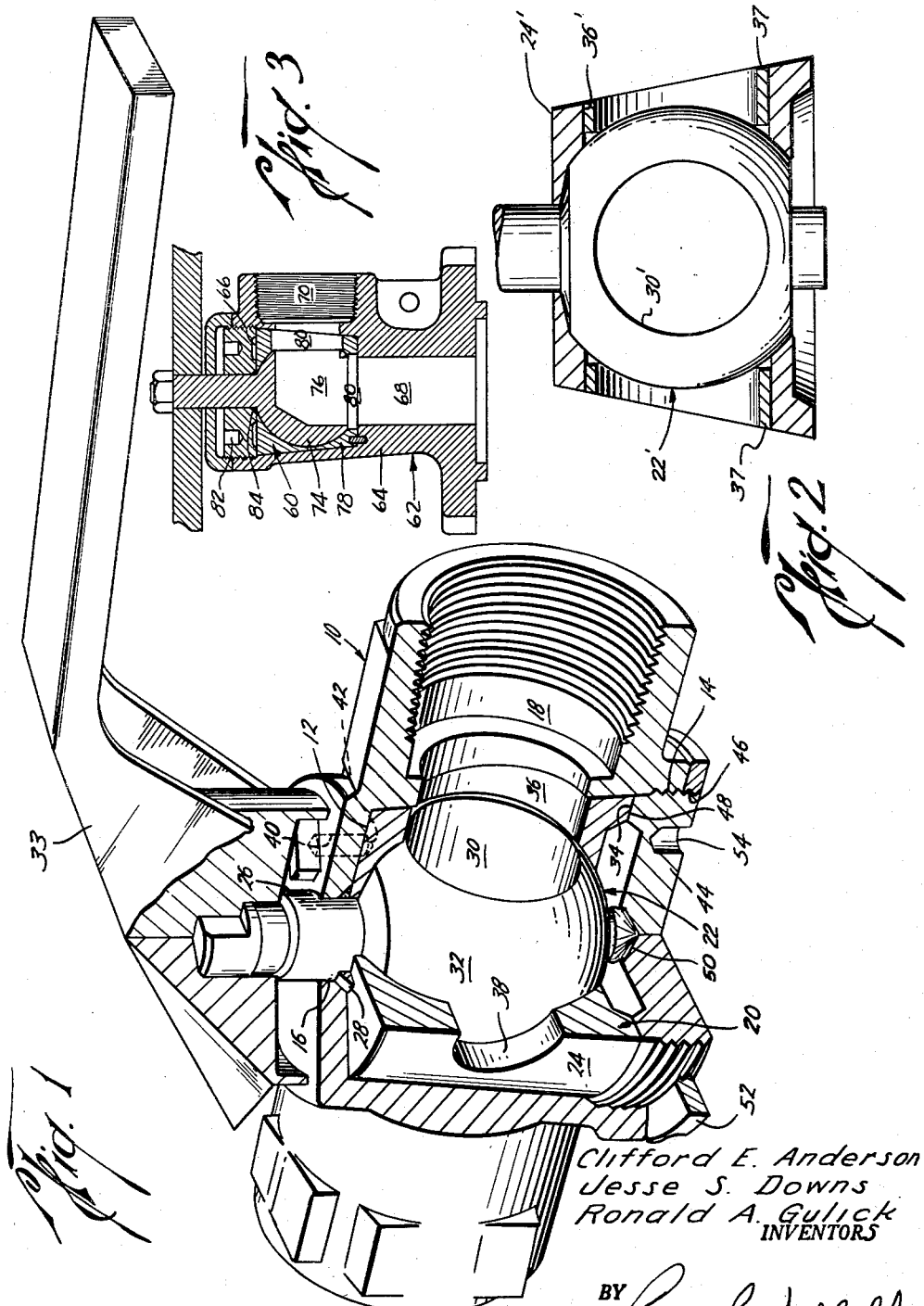
Clifford E. Anderson
Jesse S. Downs
Ronald A. Gulick
INVENTORS
BY Russell E. Schloff
ATTORNEY

United States Patent Office 3,192,948
Patented July 6, 1965

3,192,948
BALL VALVE WITH SEALING CAPSULE
Clifford E. Anderson, Jesse S. Downs, and Ronald A. Gulick, Houston, Tex., assignors to ACF Industries, Incorporated, New York, N.Y., a corporation of New Jersey
Filed June 5, 1961, Ser. No. 114,872
7 Claims. (Cl. 137—454.6)

This invention relates to rotatable plug valves and more particularly to plug valves having a valve and seat unit in which a seat member of moldable resilient material surrounds the valve member.

C. E. Anderson application S.N. 82,202 and now abandoned, entitled "Integral Valve and Seat Unit," which is assigned to the same assignee as this application, discloses a novel valve and seat unit in which the valve seat is formed of a resilient material molded about a valve member. The seat member and valve member have passages which are aligned in the valve open position to form the run of the valve. In operation, the seat member remains stationary while the valve member is rotated between open and closed positions. To utilize this unit in a valve, a valve body is formed with a valve chamber having the same configuration as the valve and seat unit. The unit is then positioned in the valve chamber and force supplying means such as a bonnet applies a load to the unit to establish a seal between the valve member and seat and between the seat and the wall of the valve chamber. A seal for the bonnet opening and the stem is also provided by the unit.

In attempting to extrapolate this unit for utilization in valves of larger sizes and higher pressures, it was discovered that certain improvements would extend the range of size and pressure. As size and pressure increased, it was found that during closing pressure would get between the wall of the valve chamber and the portion of the seat unsupported during operation. Then in the event that a seal was established between the unstream lip of seat member and the valve member prior to a seal being established between the downstream lip and the opposite side of the valve member, pressure would bleed off from within the passage of the portion of the seat member. As a result of the pressure differential, the seat member would deform into the passage of the valve member subjecting it to shearing action on further closing. It is to the alleviation of this condition that one novel aspect of the invention is directed.

Another difficulty which developed was that as the size of the valve member and the pressure rating increased the necessary amount of force applied by the bonnet to effect the proper seals was correspondingly increased with one of the last places to seal being around the stem. As this force was increased a greater torque resulted. It is to the alleviation of this condition that another novel aspect of the present invention is directed.

It was also found that having a bonnet which could apply only a fixed amount of force that the tolerances were rather close and in order to manufacture a valve which could effectively compete with other ball valves, this condition had to be alleviated. Moreover, a fixed bonnet does not readily lend itself to in-line adjustment to stop minor leakage. Another novel aspect of this invention is directed to correction of this condition.

In certain applications of valves, it was essential that the valve be provided with means so that in the event of deterioration of the resilient seat from fire or other destructive sources the flow through the valve be retained at a low level even though the resilient seat is destroyed. A further novel aspect is directed to this purpose.

It is the primary object of the present invention to improve the above-enumerated features permitting the utilization of the novel valve and seat unit of the aforementioned C. E. Anderson application in a valve which would be competitive in all respects.

The valve in the present invention discloses a valve body having an open ended valve chamber with axially aligned inlet and outlet passages communicating with the valve chamber. A valve and seat unit is positioned in the valve chamber. The unit is formed of a rotatable valve member encased in a resilient seat member. A stem extends from one end of the valve member. The valve member has a through passage which is alignable in the open position with the aligned inlet and outlet passages of the valve body. The valve member is also so provided with solid portions which cover the inlet and outlet passages in the closed position. While the valve member rotates to operate the valve, the seat member remains stationary. The seat is formed of moldable resilient material which is yieldingly deformable to minor surface irregularities. The seat has an outer configuration which generally conforms to the configuration of the valve chamber and axially aligned flow passages which align with the inlet and outlet passages of the body. Positioned at right angles to the flow passages are diametrically opposed pressure relief passages which relieve any differential pressure buildup between the seat member and the wall of the valve chamber, and also aid in cutting down the torque required to operate the valve. Positioned around the stem is a separate circular seal which is pressure acting to form a seal between the stem and the opening through which it extends. A threaded bonnet is secured in the open end of the valve chamber to close the end of the valve chamber and apply the necessary force on the unit to establish a seal between the valve member and the seat member, a seal between the seat member and wall of the valve chamber, and a seal between the valve chamber and bonnet. The bonnet is adjustable so that if a slight leakage develops at any of the above sealing areas the bonnet can be further screwed in and greater force applied to the unit which will generally stop any slight leakage. For use in hazardous service, the seat member may be provided with a metal retainer about the flow passages so that in the event of deterioration of the primary resilient seat flow through the valve will at least be retarded to a low level.

It is an object of the present invention to provide a rotatable plug valve utilizing a valve and seal unit having the seat member formed of a resilient material molded about the valve member which is provided with means to prevent the entrapment of pressure between the seat member and wall of the valve chamber.

It is another object to provide a rotatable plug valve utilizing an integral valve and seat unit with a separate pressure acting stem seal.

It is another object to provide in a valve using an integral valve and seat unit an adjustable force supplying means to the unit so that minor leakage may be stopped while the valve is in service in the line.

It is a further object to provide a valve having a primary resilient seat with means to retain flow through the valve at a low level in the event the resilient seat is destroyed.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purpose of illustration and description and are shown in the accompanying drawings, forming a part of the specification, wherein:

FIG. 1 is a perspective view partially in section of the valve of the present invention.

FIG. 2 is a vertical section of a slightly modified unit.

FIG. 3 is a vertical section of a modified valve.

Referring now to the drawings, the valve is comprised of a body 10 having an open ended frusto conical valve chamber 12, the open end of which is provided with threads 14. An aperture 16 having a flaring inner end is located in the wall of the valve chamber opposite the open end. Axially aligned inlet and outlet passages 18 communicate with the valve chamber 12. The axial outer ends of the passages 18 are provided with means to attach the valve into a flow system as is well known in the art.

Positioned in the valve chamber 12 is an integral valve and seat unit or cartridge 20. The unit 20 is formed of a rotatable generally spherical valve member 22 having a seat member 24 of resilient material molded about the valve member 22. A stem 26 extends from one end of the valve member 22. The stem may be integral with the valve member 22 as shown in the drawing or, if desired, a separate stem may be utilized and the spherical valve member 22 provided with means to matingly receive the inner end of the stem 26. The stem 26 extends through the aperture 16 in the valve body 10. To establish a seal between the stem 26 and the aperture 16, a circular pressure acting seal 28 of resilient material is positioned about the stem 26. The spherical valve member 22 is provided with a through passage 30 which is alignable in the open position with the aligned inlet and outlet passages 18 of the valve body 10. The spherical valve member 22 also has solid portions 32 which will oppose the inlet and outlet passages 18 in the closed position of the valve. Attached to the protruding end of the stem 26 is a handle 33 which with quarter turn operation moves the valve member 22 between open and closed positions.

Molded about the spherical valve member 22 is the seat member 24 formed of a resilient material which will yieldingly deform to minor surface irregularities. Materials such as polytetrafluoroethylene, known under the name "Teflon"; polytrifluorochloroethylene, known under the name "Kel-F"; and the polyamides or nylons are suitable. In certain applications, it may be possible to utilize some of the synthetic elastomers. The outer configuration of the seat member 24 conforms to the configuration of the valve chamber 12. In the preferred embodiment, this configuration is frusto conical to mate with the frusto conical shape of the valve chamber 12. However, if desired, the valve chamber 12 and outer wall of the seat member 24 may be any configuration so long as they mate. When hard material is used to form the seat member, it is desirable to have a frusto conical cavity since with such construction a longitudinal force applied along the axis of the cone will produce radial loads on the surface of the cone to establish seals between the valve member and seat, and between the seat and the wall of the cavity. While the seat member 24 generally encapsulates the valve member 22, it has been found that the bottom of the seat 24 can be relieved forming an annular sealing lip and exposing a portion of the spherical valve member 22 adjacent the axis thereof. This not only saves expensive seat material and cuts down on torque since the amount of area contacted by the valve member is reduced but also provides better sealing by the lip seating against the valve member. The bottom of the seat member 24 has an annular ledge 34 which when in contact with a force applying means, which will be described subsequently, produces a force in the outer periphery of seat member 24 which is the area producing a seal between the valve member 22 and seat member 24 and the wall of cavity 12.

The seat member 24 is provided with axially aligned flow passages 36 which align with the inlet and outlet passages 18 of the body and when the valve is in the open position will establish, together with the passage 30 of the valve member 22, the run of the valve. Positioned at right angles to the flow passages 36 are diametrically opposed pressure relief passages 38 which prevent the entrapment of line pressure between the wall of valve chamber and outer wall of the seat member. If in higher pressure valves line pressure were so trapped and the valve closed with an ensuing pressure drop in the passage 30, the pressure may be sufficient to push in the unsupported portion of the wall of the seat member 24 whereby it would be sheared by the end of the passage 30 as it continues on to the fully closed position. In lower pressure valves for sanitary service or in services where the lading may solidify when closed the passages 38 may be eliminated. However, in higher pressure valves making the relief passage 38 of considerable size as shown in the drawing helps to reduce torque by reducing surface contact area.

FIG. 2 shows means which may be incorporated in valves of the present invention for use in hazardous service. In such valves the flow passages 36' are made slightly larger than the passage 30' through the valve member 22' and the inlet and outlet passages of the valve. Inserted in each passage 36' is a metal ring 37. The surface of the ring 37 which opposes the spherical valve member 22 is circular and the surface opposing the wall of the valve chamber conforms to the outer surface of the seat member 24'. The axial length is slightly less than the length through the passage 36' so that the metal does not contact during normal operation. If fire or some other source destroys the resilient material forming the seat member 24', the valve member 22' will float over against the ring 37 and a seal will be established between the valve member 22 and ring 37 and between ring 37 and wall of the valve chamber so that at least flow through the valve will be kept at a low level.

In order to align the seat during assembly and to provide a positive means for maintaining the seat member 24 nonrotative, the end of the valve chamber 12 opposite the open end is provided with an alignment member 40 and the seat member 24 is provided with an indentation 42 which mates with and receives the alignment member 40. If desired, the alignment member 40 may extend through the body and serve as one of the stops for the handle 33.

Closing the open end of the valve chamber 12 is a bonnet 44 which has threads 46 about its periphery. The threads 44 engage with threads 14 in the open end of the valve chamber. The bonnet 44 has an annular raised portion 48 which contacts the annular ledge 34 of the seat member 24 and applies force to the unit 20 driving it into the valve chamber 12 where the unit 20 makes intimate contact with the wall of the valve chamber to establish a seal between the surface of the valve member 22 and the wall of the valve chamber 12. A seal is also established between the valve member 22 and the inner wall of the valve member 24. At the same time, a seal is established between the open end valve chamber 12 and bonnet 44. Moreover, the force applied by the axial inward movement of the bonnet 44 seats the stem seal 28 in the flaring end of the aperture 16 changing the seal 28 from an initial rectangular cross-section to conform to the shape of the actual flared end. Having a separate pressure acting stem seal 28 has considerably reduced the amount of force required to be supplied by the bonnet 44 since the stem seal was the last portion to seal. To prevent the spherical valve member 22 from bottoming out and contacting the bonnet, the center of the bonnet 44 is provided with a centrally located drill point recess 50 which is slightly larger than the bottom of the spherical valve member 22.

A lock nut retainer 52 is secured to the threaded bonnet 40 to lock it in place after the necessary seals have been established. In order that the bonnet may be rotated without damaging the threads, spanner holes 54 are provided in the bottom of the bonnet 44. If in operation the valve develops a slight leak, the lock nut retainer 52 may be backed off and the bonnet 44 tightened. This may be accomplished while the valve is in the line and on flow.

Due to the fact that the sealing of the cartridge is primarily from deformation within the resilient seat member, the cartridge will produce an equally efficient seal with ports emitting from any direction around the periphery of the seat member and one port may even be located at the end opposite the stem connection at any interim angle. FIG. 3 shows an example of a cartridge 10 being used in an angle valve 62. The angle valve 62 shown is particularly adaptable for railroad tank car use where the lading sometimes solidifies. Since the lading in the valve in the closed position is not cut off from the main body of the lading, if heat is applied to the lading to liquefy it, the heat will also be applied to the lading in the valve and special steam jacketing of the valve will be eliminated.

The valve 62 has a body 64 having a chamber 66 with which an inlet port 68 and outlet port 70 communicate. In this instance the axes of the inlet port 68 and outlet port 70 are at right angles to each other. Aligned with the axis of the inlet port 68 there is an opening 72 for the chamber 66. Positioned in the chamber 66 is the cartridge 60. The cartridge 60 is similar to the cartridge 20 except that the valve member 74 has a right angle passage 76 rather than a straight through passage as does the valve member 22. Also, the resilient seat member 78 which is molded about the valve member 74 has flow passages 80—80 which are at right angles to each other. The flow passages 80—80 align with the inlet and outlet ports 68-70 of the valve. A bonnet 82 closes the opening 72. The bonnet 82 has an aperture through which the stem from the valve mmeber 74 extends. A separate circular resilient pressure acting stem seal 84 is positioned about the stem and establishes a seal between the stem and the aperture in the bonnet 82. Axial inward movement of the bonnet 82 causes the resilient seat member 78 to establish intimate sealing contact with the wall of the chamber 66 and the surface of the valve member 74. The inward movement of the bonnet 82 also seats the separate pressure acting resilient stem seal 84. As in the case of the cartridge 20, the greater the force generated by the bonnet 82 the tighter the seals of the valve 62. If minor leakage occurs, further inward movement of the bonnet will cause tighter contact of all sealing surfaces and the leakage will be stopped. This adjustment may be made while the valve is in service and the one adjustment will correct any minor leakage.

As can be seen from the foregoing, the integral valve and seat unit or cartridge provides an excellent sealing unit for a valve and one that is adaptable to a wide range of applications. It permits by a single adjustment—while the valve is in service—a tightening of the contact with all sealing surfaces. It is easy to replace while the valve is in the line. The separate pressure acting stem seal provides an excellent seal between the stem and the aperture through which it extends.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What we claim is:
1. A rotatable spherical plug valve comprising:
 (1) a valve body having:
  (a) a frusto conical open ended valve chamber the open end of which is provided with threads,
  (b) an aperture in the body opposite the open end of the valve chamber,
  (c) axially aligned inlet and outlet passages communicating with said chamber;
 (2) an integral valve and seat unit positioned in said valve chamber, said unit being formed of
  (a) a rotatable generally spherical valve member having
   (1) an integral stem extending from one end of the valve member and passing through the aperture in the body,
   (2) a through passage alignable in the open position with the aligned inlet and outlet passages of the valve body,
   (3) solid portions covering in the closed position the inlet and outlet passages of the valve body,
  (b) an integral seat member of moldable resilient material yieldingly deformable to conform to minor surface irregularities about said spherical valve member, said seat member having
   (1) a generally frusto conical outer configuration generally conforming to the configuration of the valve chamber,
   (2) axially aligned flow passages aligned with the inlet and outlet passages of the body but being of a slightly greater diameter,
   (3) an annular metal ring positioned in each of said flow passages being of the same inner diameter as the inlet and outlet passage and having an axial length slightly less than the axial length of the passage,
   (4) diametrically opposed pressure relief passages at right angles to the flow passages;
 (3) means in the body co-operating with the seat member to retain the seat member non-rotative;
 (4) a circular seal positioned about the stem and serving as a stem seal;
 (5) a threaded bonnet engaged with the threads in the open end of valve chamber closing the open end of the valve chamber and applying a force on the unit to establish
  (a) a seal between the spherical valve member and the seat member,
  (b) a seal between the seat member and wall of the valve chamber,
  (c) a seal between the valve chamber and bonnet;
 (6) means retaining the bonnet in position;
 (7) a handle attached to the protruding end of the stem, said handle having a portion co-operating with the means securing the unit non-rotative whereby said means acts as a stop for the opened and closed positions of the valve.
2. A rotatable spherical plug valve comprising:
 (1) a valve body having:
  (a) a frusto conical open ended valve chamber the open end of which is provided with threads,
  (b) an aperture in the body opposite the open end of the valve chamber,
  (c) axially aligned inlet and outlet passages communicating with said chamber;
 (2) a valve and seat unit positioned in said valve chamber, said unit being formed of
  (a) a rotatable generally spherical valve member having
   (1) an integral stem extending from one end of the valve member and passing through the aperture in the body,
   (2) a through passage alignable in the open position with the aligned inlet and outlet passages of the valve body,
   (3) solid portions covering in the closed position the inlet and outlet passages of the valve body,
  (b) an integral seat member of moldable resilient material yieldingly deformable to conform to minor surface irregularities about said spherical valve member, said seat member having
    (1) a generally frusto conical outer configuration generally conforming to the configuration of the valve chamber,
    (2) axially aligned flow passages aligned with the inlet and outlet passages of the body but being of a slightly greater diameter,
    (3) an annular metal ring positioned in each of said flow passages being of the same inner diameter as the inlet and outlet passages and having an axial length slightly less than the axial length of the passage;
(3) means in the body co-operating with the seat member to retain the seat member non-rotative;
(4) a circular seal positioned about the stem and serving as a stem seal;
(5) a threaded bonnet engaged with the threads in the open end of valve chamber closing the open end of the valve chamber and applying a force on the unit to establish
    (a) a seal between the spherical valve member and the seat member,
    (b) a seal between the seat member and wall of the valve chamber,
    (c) a seal between the valve chamber and bonnet;
(6) means retaining the bonnet in position;
(7) a handle attached to the protruding end of the stem, said handle having a portion co-operating with the means securing the unit non-rotative whereby said means acts as a stop for the opened and closed positions of the valve.

3. A rotatable plug valve comprising:
(1) a valve body having:
    (a) a valve chamber defined in said body, said valve chamber being open at one end thereof,
    (b) an aperture in the body opposite the open end of the valve chamber,
    (c) axially aligned inlet and outlet passages communicating with said chamber,
(2) a valve and seat unit adapted to be positioned in said valve chamber, said unit being formed of
    (a) a rotatable valve member having
        (1) stem means extending from one end of said valve member along an axis thereof and adapted to pass through the aperture in the body,
        (2) a through passage alignable in the open position with the aligned inlet and outlet passages of the valve body,
        (3) solid portions covering in the closed position the inlet and outlet passages of the valve body;
    (b) an integral seat member of moldable resilient plastic material yieldingly deformable to conform to minor surface irregularities of said valve member and having
        (1) an outer configuration generally conforming to the configuration of the valve chamber,
        (2) axially aligned flow passages aligned with the through passage of the valve in the open position of the valve and alignable with the inlet and outlet passages of the body,
        (3) an annular ring member positioned in each of the flow passages and being of the same inner diameter as the inlet and outlet passages and having an axial length slightly less than the axial length of the passage,
        (4) an opening defined in a wall of the seat and exposing an axial portion of the valve member,
(3) an adjustable bonnet positioned within the open end of the valve chamber and having
    (a) an imperforate wall closing the open end of the valve chamber,
    (b) means integral with the bonnet for engaging and applying a force on a peripheral portion of the seat member to establish a seal between the valve member and the seat member.

4. A rotatable plug valve comprising:
(1) a valve body having:
    (a) a valve chamber defined in said body, said valve chamber being open at one end thereof,
    (b) an aperture in the body opposite the open end of the valve chamber,
    (c) a chamfer about said aperture defining with the stem a stem seal pocket, said stem steal pocket being a continuation of the valve chamber,
    (d) axially aligned inlet and outlet passages communicating with said chamber,
(2) a valve and seat unit adapted to be positioned in said valve chamber, said unit being formed of
    (a) a rotatable valve member having
        (1) stem means extending from one end of said valve member along an axis thereof and adapted to pass through the aperture in the body,
        (2) a through passage alignable in the open position with the aligned inlet and outlet passages of the valve body,
        (3) solid portions covering in the closed position of the valve the inlet and outlet passages of the valve body,
    (b) a seat member of moldable resilient plastic material yieldingly deformable to conform to minor surface irregularities of said valve member and having
        (1) an outer configuration generally conforming to the configuration of the valve chamber,
        (2) axially aligned flow passages aligned with the through passage of the valve in the open position of the valve and alignable with the inlet and outlet passages of the body,
(3) a sealing member positioned about the stem and forced within the stem seal pocket by the seat member and stem to establish
    (a) a seal between the stem and the body,
    (b) a seal between the seat member and the body.

5. A rotatable plug valve comprising:
(1) a valve body having:
    (a) a valve chamber defined in said body, said valve chamber being open at one end thereof,
    (b) an aperture in the body opposite the open end of the valve chamber,
    (c) a chamfer about said aperture defining with the stem a stem seal pocket, said stem seal pocket being a continuation of the valve chamber,
    (d) axially aligned inlet and outlet passages communicating with said chamber,
(2) a valve seat unit adapted to be positioned in said valve chamber, said unit being formed of
    (a) a rotatable valve member having
        (1) stem means extending from one end of said valve member along an axis thereof and adapted to pass through the aperture in the body,
        (2) a through passage alignable in the open position with the aligned inlet and outlet passages of the valve body,
        (3) solid portions covering in the closed position of the valve the inlet and outlet passages of the valve body,
    (b) a seat member of moldable resilient plastic material yieldingly deformable to conform to minor surface irregularities of said valve member and having
(1) an outer configuration generally conforming to the configuration of the valve chamber,
(2) axially aligned flow passages aligned with the through passage of the valve in the open position of the valve and alignable with the inlet and outlet passages of the body,
(3) an opening defined in the wall thereof and exposing an axial portion of the valve member,
(4) circular sealing lips defined by the opening,
(3) an adjustable bonnet positioned within the open end of the valve chamber and having
(a) an imperforate wall closing the open end of the valve chamber,
(b) means integral with the bonnet for engaging and applying a force on a peripheral portion of the seat member to establish a seal between the valve member and the sealing lips of the seat member,
(4) an annular sealing member positioned about the stem and forced within the stem seal pocket by the seat member and stem to establish
(a) a seal between the stem and the body
(b) a seal between the seat member and the body, 6. A rotatable plug valve comprising:
(1) a valve body having:
(a) a valve chamber defined in said body, said valve chamber being open at one end thereof,
(b) an aperture in the body opposite the open end of the valve chamber,
(c) a chamfer about said aperture defining with the stem a stem seal pocket, said stem seal pocket being a continuation of said valve chamber,
(d) axially aligned inlet and outlet passages communicating with said chamber;
(2) a valve and seat unit adapted to be positioned in said valve chamber, said unit being formed of
(a) a rotatable valve member having
(1) stem means extending from one end of said valve member along an axis thereof and adapted to pass through the aperture in the body,
(2) a through passage alignable in the open position with the aligned inlet and outlet passages of the valve body,
(3) solid portions covering in the closed position of the valve the inlet and outlet passages of the valve body,
(b) a seat member of the moldable resilient plastic material yieldingly deformable to conform to minor surface irregularities of said valve member, and having
(1) an outer configuration generally conforming to the configuration of the valve chamber,
(2) axially aligned flow passages aligned with the through passage of the valve in the open position of the valve and alignable with the inlet and outlet passage of the body,
(3) diametrically opposed pressure relief passages formed at right angles to the flow passages;
(3) a sealing member positioned about the stem and forced within the stem seal pocket by the seat member and stem to establish
(a) a seal between the stem and the body,
(b) a seal between the seat member and the body.

7. A rotatable plug valve comprising:
(1) a valve body having:
(a) a valve chamber defined in said body, said valve chamber being open at one end thereof,
(b) an aperture in the body opposite the open end of the valve chamber,
(c) a chamfer about said aperture defining with the stem a stem seal pocket,
(d) axially aligned inlet and outlet passage communicating with said chamber,
(2) a valve and seat unit adapted to be positioned in said valve chamber, said unit being formed of
(a) a rotatable valve member having
(1) stem means extending from one end of said valve member along an axis thereof and adapted to pass through the aperture in the body,
(2) a through passage alignable in the open position with the aligned inlet and outlet passages of the valve body,
(3) solid portions covering in the closed position of the valve the inlet and outlet passages of the valve body,
(b) a seat member of moldable resilient plastic material yieldingly deformable to conform to minor surface irregularities of said valve member, and having
(1) an outer configuration generally conforming to the configuration of the valve chamber,
(2) axially aligned flow passages aligned with the through passage of the valve in the open position of the valve and alignable with the inlet and outlet passages of the body,
(3) diametrically opposed pressure relief passages formed at right angles to the flow passages,
(4) an annular ring member positioned in each of the flow passages and being of the same inner diameter as the inlet and outlet passages and being adapted to contact the valve member only upon deterioration of the seat member,
(5) an opening defined in a wall thereof exposing a portion of the valve member;
(3) an adjustable bonnet positioned within the open end of the valve chamber and having
(a) an imperforate wall closing the open end of the valve chamber,
(b) means integral with the bonnet for engaging and applying a force on a peripheral portion of the seat member to establish a seal between the valve member and the seat member.

References Cited by the Examiner

UNITED STATES PATENTS

| | | | |
|---|---|---|---|
| 860,217 | 7/07 | Jackson | 137—454.6 |
| 2,117,456 | 5/38 | Schellin | 251—309 |
| 2,271,349 | 1/42 | Saurer | 137—561 XR |
| 2,387,013 | 10/45 | Fuller | 251—368 XR |
| 2,424,210 | 7/47 | Sutton | 251—167 |
| 2,905,197 | 9/59 | Janes | 251—368 XR |
| 2,911,187 | 11/59 | Owsley | 251—316 |
| 2,913,219 | 11/59 | Freed | 251—317 XR |
| 3,041,036 | 6/62 | McFarland | 251—315 XR |
| 3,061,267 | 10/62 | Hamer | 251—317 XR |

FOREIGN PATENTS 690,367  4/53  Great Britain.

ISADOR WEIL, *Primary Examiner.*